US012786222B2

(12) United States Patent
Ankad et al.

(10) Patent No.: US 12,786,222 B2
(45) Date of Patent: Nov. 3, 2026

(54) DYNAMIC THREAT INTELLIGENCE MODEL TO HANDLE NETWORK ATTACKS

(71) Applicant: INTERNATIONAL BUSINESS MACHINES CORPORATION, Armonk, NY (US)

(72) Inventors: Iranna Dharmaraya Ankad, Bengaluru (IN); Manvanthara Bekkalee Puttashankar, Bangalore (IN); Nageswara Sastry Renduchintala, Bengaluru (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 18/913,502

(22) Filed: Oct. 11, 2024

(65) Prior Publication Data

US 2026/0106881 A1 Apr. 16, 2026

(51) Int. Cl.
*H04L 9/40* (2022.01)
*H04L 41/16* (2022.01)

(52) U.S. Cl.
CPC ...... *H04L 63/1425* (2013.01); *H04L 63/1416* (2013.01); *H04L 41/16* (2013.01)

(58) Field of Classification Search
CPC .. H04L 63/1425; H04L 63/1416; H04L 41/16
See application file for complete search history.

(56) References Cited

U.S. PATENT DOCUMENTS 6,862,286 B1 3/2005 Tams
7,761,558 B1 7/2010 Jindal
7,900,240 B2 3/2011 Terzis
2012/0079090 A1 3/2012 Johnsen
2013/0085932 A1 4/2013 Waldron
2017/0310686 A1* 10/2017 Ray ......................... H04L 63/08
2020/0074439 A1 3/2020 Hayman
(Continued)

FOREIGN PATENT DOCUMENTS

CN 101986741 B 9/2013
CN 113225349 A 8/2021
CN 117914578 A 4/2024
(Continued)

OTHER PUBLICATIONS

Catuogno et al., "A Honeypot System with Honeyword-driven Fake Interactive Sessions", 2015 International Conference on High Performance Computing & Simulation (HPCS), vol. 18, No. 3, Jul. 1, 2021, pp. 2041-2052, XP011893036.
(Continued)

*Primary Examiner* — Ayoub Alata
(74) *Attorney, Agent, or Firm* — Seed Intellectual Property Law Group LLP

(57) ABSTRACT

Mechanisms are provided to include in a header of a network communications data structure, an identifier comprising a compliance flag ratio (CFR). Operations are performed for computing a value for the CFR of a network address, and based on the computed value for the CFR of the network address, a determination is made as to whether additional operations to ensure security are to be performed for communications with the network address.

20 Claims, 8 Drawing Sheets

(56) References Cited

U.S. PATENT DOCUMENTS

2023/0214876 A1* 7/2023 Raush ................ G06Q 30/0277 705/14.42

FOREIGN PATENT DOCUMENTS

GB 2574283 A 12/2019
IN 202411008040 A 2/2024

OTHER PUBLICATIONS

Fu et al., "A Worm Containment Model Based on Neighbour-Alarm", Autonomic and Trusted Computing, XP019096588, Jul. 11, 2007, pp. 449-457.

International Searching Authority, "Invitation to Pay Additional Fees and, Where Applicable, Protest Fee," Patent Cooperation Treaty, Dec. 15, 2025, 14 pages, International Application No. PCT/EP2025/077359.

Radoglou-Grammatikis et al., "Modeling, Detecting, and Mitigating Threats Against Industrial Healthcare Systems: A Combined Software Defined Networking and Reinforcement Learning Approach", IEEE Transactions on Industrial Informatics, vol. 18, No. 3, Jul. 1, 2021 pp. 2041-2052, XP011893036.

Yousefi Azar et al., "Unsupervised Learning for security of Enterprise networks by micro-segmentation", arXiv:2003.11231, Mar. 1, 2020, pp. 1-6, XP093341010.

"Mitigating Layer 2 Network Attacks with SecHard," SecHard, 2024, 11 pp.

A. Jawahar, et al., "DDoS mitigation using blockchain and machine learning techniques," Springer Link, Jan. 4, 2024, 8 pp.

M. Verkerken, et al., "Unsupervised Machine Learning Techniques for Network Intrusion Detection on Modern Data," IEEE, 2020, 8 pp.

Y. Xiang, et al., "Flexible Deterministic Packet Marking: An IP Traceback System to Find the Real Source of Attacks," IEEE, IEEE transactions on Parallel and Distributed Systems, vol. 20, No. 4, Apr. 2009, 14 pp.

* cited by examiner

500

DYNAMIC THREAT INTELLIGENCE MODEL TO HANDLE NETWORK ATTACKS

BACKGROUND

Embodiments relate to a method, system, and computer program product for a dynamic threat intelligence model to handle network attacks.

A Media Access Control address (referred to as Mac or MAC address) is a hardware identifier that uniquely identifies each device on a network. An Internet Protocol (IP) address helps identify a device connected to a network. An Internet Service Provider or network administrator may assign an IP address. IP addresses are associated with TCP/IP, where TCP/IP stands for Transmission Control Protocol/Internet Protocol which is a suite of communication protocols used to interconnect network devices on the Internet.

The Address Resolution Protocol (ARP) is the bridge that connects Mac to IP addresses. ARP is employed between Layer 2 and Layer 3 on a local area network (LAN). ARP maps IP addresses to network devices' Mac addresses and vice versa.

SUMMARY

Provided are a method, system, and computer program product in which mechanisms are provided to include in a header of a network communications data structure, an identifier comprising a compliance flag ratio (CFR). Operations are performed for computing a value for the CFR of a network address, and based on the computed value for the CFR of the network address, a determination is made as to whether additional operations to ensure security are to be performed for communications with the network address.

In additional embodiments, the header is of an Internet Protocol (IP) address, wherein a reserved bit of the header is used to embed the value for the CFR.

In further embodiments, operations are performed for creating and managing subnet level policies for dynamic zoning by using k-means which is an unsupervised machine learning mechanism, wherein at least two different zones have different levels of security requirements.

In certain embodiments, in response to a security breach, a Bayesian and Thompson sampling model is used to contact trace a malicious IP address and isolate communications with the malicious IP address.

In further embodiments, each conventional external and internal IP header is converted to a compliant IP header by embedding the CFR, wherein a mapping of an IP address and a corresponding Media Access Control (MAC) address is maintained.

In certain embodiments, the CFR maintains information on a safety level of a source IP and stores changes in the safety level over time.

In further embodiments, the value of the CFR denotes a level of safety of communications with an IP or MAC address.

In additional embodiments, a neighbor alert policy is configured, wherein in response to any system within a subnet of a network being compromised with an attack, all neighbors of the system that is compromised and a central monitoring system are alerted, to restrict further spread of threat posed by the attack, by completely isolating the system that is compromised and an IP address causing the attack, from rest of the network.

In further embodiments, in response to any malicious IP login requests with a suspected value for the CFR, a fake root shell or session is presented, wherein the fake root shell allows execution of regular commands but restricts execution of potentially harmful commands, and wherein the fake root shell or the session is used to handle any non-interactive login requests and restrict execution of harmful remote commands.

BRIEF DESCRIPTION OF THE DRAWINGS

Referring now to the drawings in which like reference numbers represent corresponding parts throughout.

DETAILED DESCRIPTION

Figure 1:
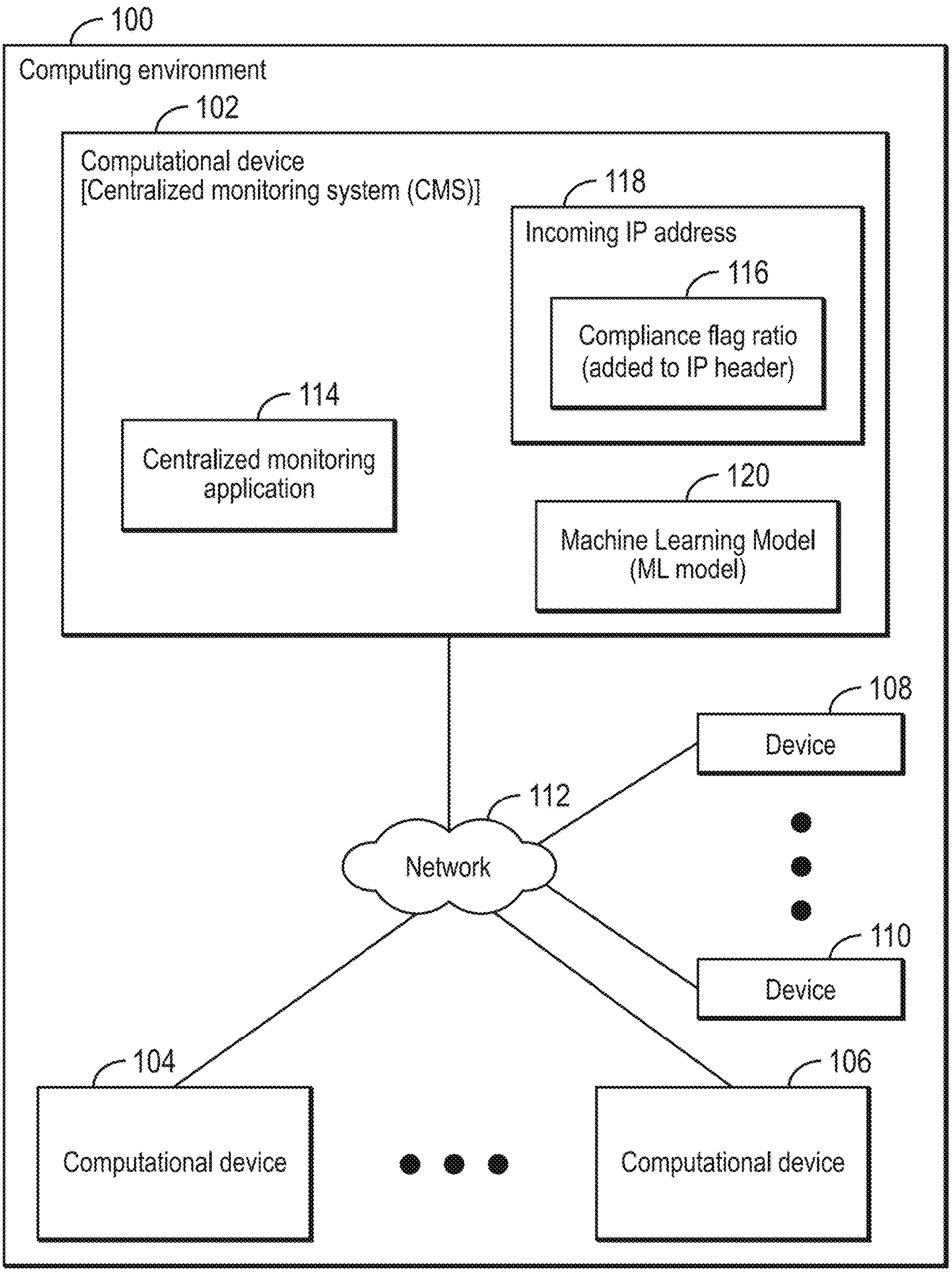
FIG. 1 illustrates a block diagram of a computing environment, in accordance with certain embodiments.

In the following description, reference is made to the accompanying drawings which form a part hereof and which illustrate several embodiments. It is understood that other embodiments may be utilized and structural and operational changes may be made.

Several examples will now be provided to further clarify various aspects of the present invention:

Example 1: A method in which mechanisms are provided to include in a header of a network communications data structure, an identifier comprising a compliance flag ratio (CFR). Operations are performed for computing a value for the CFR of a network address, and based on the computed value for the CFR of the network address, a determination is made as to whether additional operations to ensure security are to be performed for communications with the network address. As a result, security is ensured in a network.

Example 2: The limitations of Example 1, in which the header is of an Internet Protocol (IP) address, wherein a reserved bit of the header is used to embed the value for the CFR. As a result, the reserved bit of the header is used to ensure security in a network.

Example 3: The limitations of any of Examples 1-2, where operations are performed for creating and managing subnet level policies for dynamic zoning by using a k-means which is an unsupervised machine learning mechanism, wherein at least two different zones have different levels of security requirements. As a result, machine learning is used to manage subnet level policies.

Example 4: The limitations of any of Examples 1-3, where in response to a security breach, a Bayesian and Thompson sampling model is used to contact trace a malicious IP address and isolate communications with the malicious IP address.

As a result, malicious IP addresses are restricted from communicating with a device.

Example 5: The limitations of any of Examples 1-4, where each conventional external and internal IP header is converted to a compliant IP header by embedding the CFR, wherein a mapping of an IP address and a corresponding Media Access Control (MAC) address is maintained. As a result, a modified IP header is used to maintain security in a network.

Example 6: The limitations of any of Examples 1-5, where the CFR maintains information on a safety level of a source IP and stores the changes in the safety level over time. As a result, safety levels of a source IP are used for security in a network.

Example 7: The limitations of any of Examples 1-6, where the value of the CFR denotes a level of safety of communications with an IP or MAC address. As a result, the safety level of communications with an IP address is maintained.

Example 8: The limitations of any of Examples 1-7, where a neighbor alert policy is configured, wherein in response to any system within a subnet of a network being compromised with an attack, all neighbors of the system that is compromised and a central monitoring system are alerted, to restrict further spread of threat posed by the attack, by completely isolating the system that is compromised and an IP address causing the attack, from rest of the network. As a result, a compromised system is isolated for maintaining network security.

Example 9: The limitations of any of Examples 1-8, where in response to any malicious IP login requests with a suspected value for the CFR, a fake root shell or session is presented, wherein the fake root shell allows execution of regular commands but restricts execution of potentially harmful commands, and wherein the fake root shell or the session is used to handle any non-interactive login requests and restrict execution of harmful remote commands. As a result, restrictions are placed on potentially harmful commands.

Example 10: A system comprising a memory and a processor coupled to the memory, where the processor performs a method according to any of Examples 1-9. As a result, security is ensured in a network.

Example 11: A computer program product comprising a computer readable storage medium having computer readable program code embodied therewith, where the computer readable program code when executed is configured to perform a method according to any of Examples 1-9. As a result, security is ensured in a network.

Malicious IP and Mac addresses pose a significant threat in today's interconnected digital landscape. IP and Mac addresses are unique numerical identifiers assigned to every networking device connected to the Internet, allowing them to communicate with each other. While most of the IP/Mac addresses are used for legitimate purposes, there are those that are operated by malicious entities with harmful intentions.

Attackers use sophisticated techniques to gain unauthorized access to computer systems, networks, or individual devices, distribute malware and such attackers may involve themselves in distributed denial-of-service (DDoS) attacks and phishing campaigns. They may exploit vulnerabilities in software, hack root passwords, or use social engineering tactics to breach security measures. Once inside, hackers may steal sensitive information, install malware, modify, or delete data, or even take control of the compromised system.

To combat the threat from malicious IP or Mac addresses, organizations and system administrators employ various security measures. These include deploying firewalls, intrusion detection and prevention systems, and security software with robust threat intelligence capabilities. Additionally, maintaining up-to-date software and promptly patching vulnerabilities can significantly reduce the risk of exploitation. Network administrators and security teams continuously monitor network traffic for suspicious activities and indicators of compromise, blocking or mitigating malicious IP addresses when identified. Overall, the threat from malicious IP or Mac addresses is a persistent and an ever-evolving challenge in the cybersecurity landscape.

Certain embodiments improve the operations of computational devices in computing environments by addressing a number of problems that are encountered in network environments.

For example, certain embodiments deal with external network threats coming from layer 3 (i.e., malicious IP) or layer 2 (i.e., malicious Mac) either via interactive or non-interactive logins. Certain embodiments may detect and prevent such malicious activity at the very first entry gate of a networking system.

Other embodiments may deal with insider threats. For example, even if the hacker is successful in breaking the first level authentication gate, certain embodiments avoid or minimize security risks by invoking multi-layered security solutions to effectively handle the threats.

Certain additional embodiments take a preventive action to security threats. Such embodiments may have the ability to restrict the network access by creating dynamic network zones based on the classification of IP and Mac addresses in the subnet.

Certain embodiments may take a reactive approach to security threats. Upon detecting any new security threat incidents, such embodiments may have a capability to quickly prevent further intrusion and also contact trace the malicious IP/Mac.

Certain embodiments address the cybersecurity problems outlined above at both layer 2 and layer 3 networks.

FIG. 1 illustrates a block diagram of a computing environment 100, in accordance with certain embodiments.

The computing environment 100 is comprised of a plurality of computational devices 102, 104, 106 and a plurality of devices 108, 110 coupled over a network 112.

The computational device 102 executes a centralized monitoring application 114 for handling network attacks. In certain embodiments, the centralized monitoring application 114 may be implemented in hardware, firmware, software, or any combination thereof. The computational device 102 that executes the centralized monitoring application 114 may be referred to as a centralized monitoring system (CMS) 102.

The computational devices 102, 104, 106 may in certain embodiments comprise any suitable computational device known in the art such as a server, a personal computer, a laptop, a mainframe, etc. The devices 108, 110 may in certain embodiments comprise any device known in the art such as adapters, routers, switches, peripherals such as printers, etc. The network 112 may comprise any suitable network known in the art such as the Internet, a local area network, a wide area network, etc.

In certain embodiments, the centralized monitoring system (CMS) 102 pre-embeds a compliance flag ratio (CFR) field 116 into the IP header format of every incoming IP address 118. A machine learning model 120 associated with the CMS 102 calculates a score referred to as a CFR score, where the CFR score is a measure of how safe the source IP is. Therefore, FIG. 1 illustrates a computing environment in which network attacks are handled by a centralized monitoring application 114.

Figure 2:
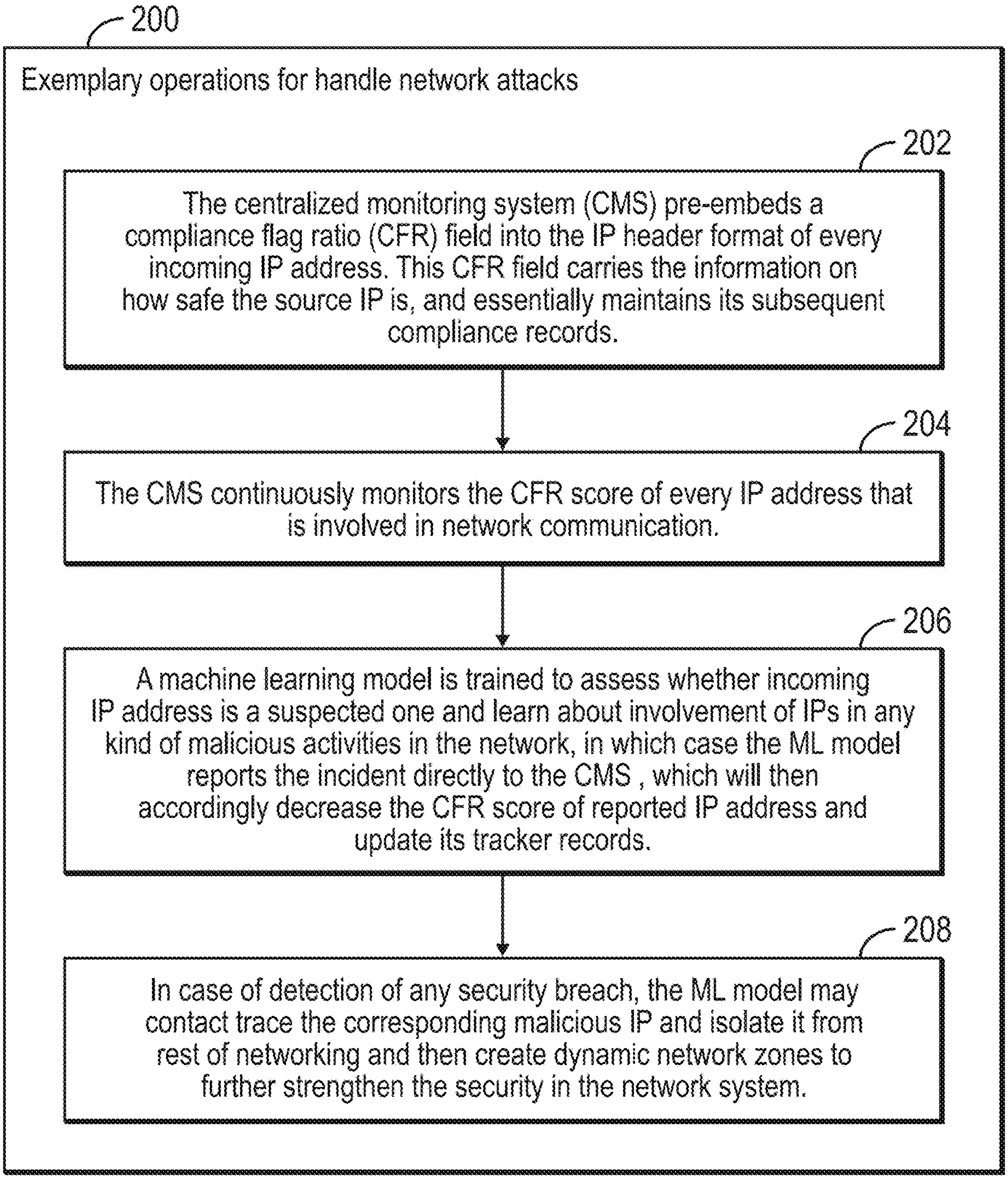
FIG. 2 illustrates a flowchart that shows exemplary operations to handle network attacks, in accordance with certain embodiments.

FIG. 2 illustrates a flowchart 200 that shows exemplary operations to handle network attacks, in accordance with certain embodiments.

Control starts at block 202 in which the CMS 102 pre-embeds a compliance flag ratio (CFR) field 116 into the IP header format of every incoming IP address 118. This CFR field carries the information on how safe the source IP is, and maintains its subsequent compliance records.

Control proceeds to block 204 in which the CMS continuously monitors the CFR score of every IP address that is involved in network communication. A machine learning (ML) model 120 is trained (at block 206) to assess whether incoming IP address is a suspected one and learn about involvement of IPs in any kind of malicious activities in the network, in which case the ML model 120 reports the incident directly to the CMS 102, which may then accordingly decrease the CFR score of the reported IP address and update its tracker records.

In case of detection of any security breach, the ML model 120 may contact trace (at block 208) the corresponding malicious IP and isolate it from rest of networking and then create dynamic network zones to further strengthen the security in the network system.

Figure 3:
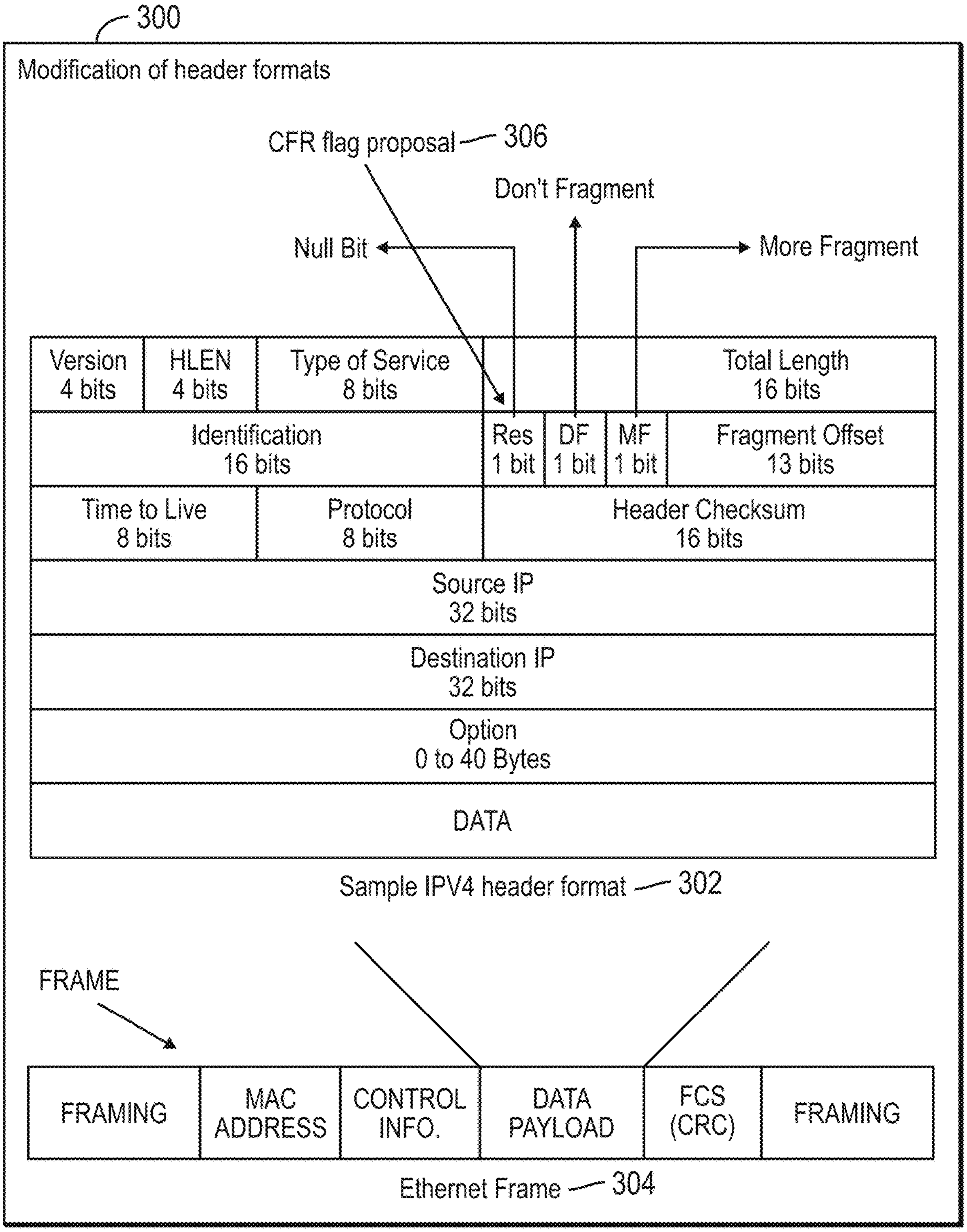
FIG. 3 illustrates a block diagram that shows modification of header formats, in accordance with certain embodiments.

FIG. 3 illustrates a block diagram 300 that shows modification of header formats, in accordance with certain embodiments.

Certain embodiments provide a mechanism to change the design of IP header format (a sample IP header format change for IPV4 header format 302 that is included in an Ethernet frame 304 is shown in FIG. 3) by embedding a new flag called compliance flag ratio (CFR) into every IP address that is involved in the network communication within an organization. Certain embodiments use reserved bits of IP header to embed this CFR value.

The changes to the IP header to include the CFR flag are shown via the arrow labeled as the CFR flag proposal 306 in FIG. 3.

Figure 4:
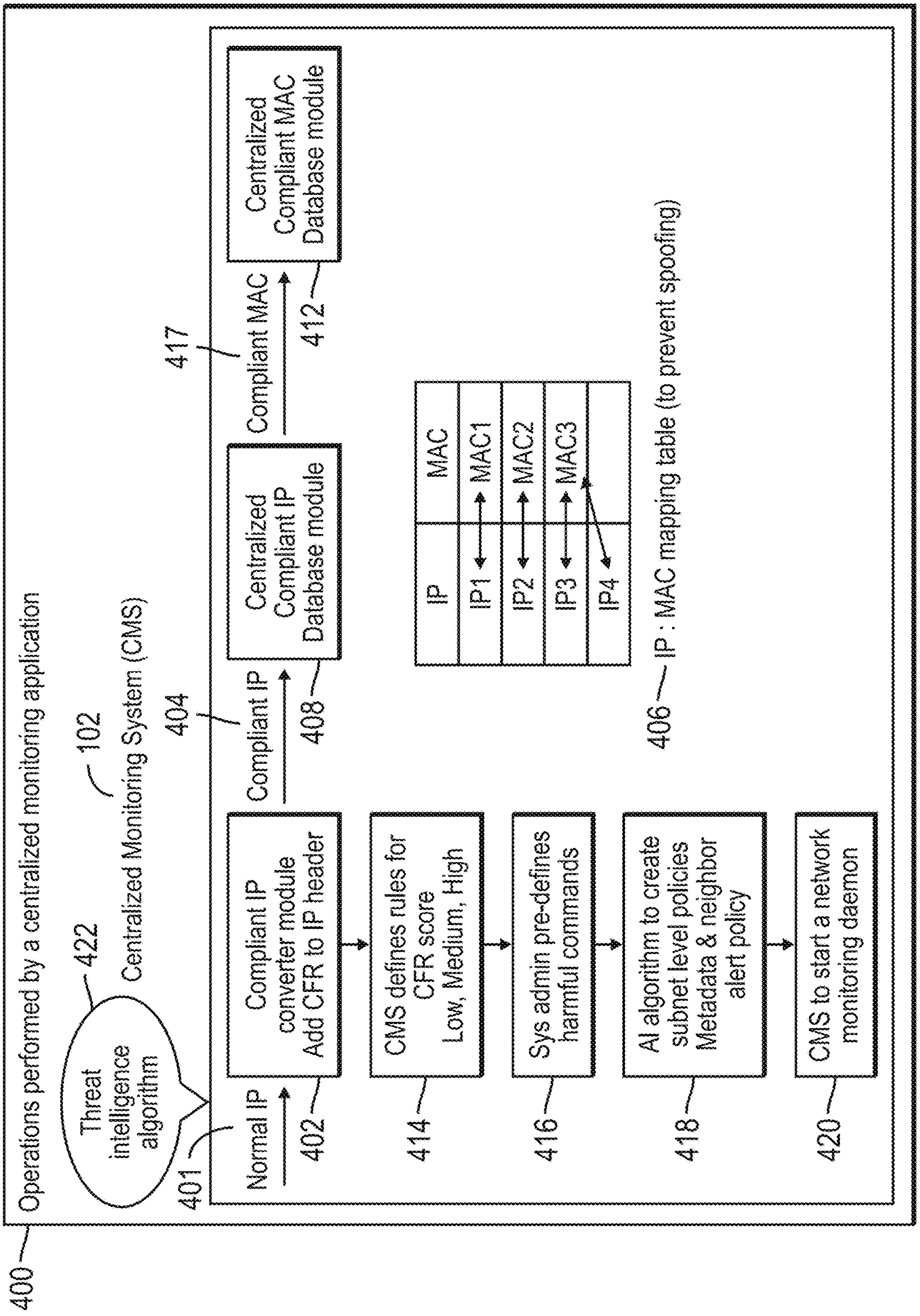
FIG. 4 illustrates a block diagram that shows operations performed by a centralized monitoring application, in accordance with certain embodiments.

FIG. 4 illustrates a block diagram 400 that shows operations performed by a centralized monitoring application 114, in accordance with certain embodiments.

In certain embodiments, a compliant IP converter module may at block 402 convert each internal and external IP (Normal IP 401) into compliant IP 404 by embedding a CFR flag and every IP will be registered into the Centralized Monitoring System (CMS) 102. CMS will also create compliant IP: MAC mapping table 406 to ensure each IP is mapped to its corresponding MAC to detect and prevent any spoofing at IP or MAC level. The compliant IP addresses are stored in the centralized compliant IP database module 408, and the compliant MACs 417 in the centralized compliant MAC database module 412.

From block 402 control proceeds to block 414 where the CMS defines rules for CFR scores, where the scores can be low, medium, or high. The system administrator pre-defines harmful commands at block 416 and then an Artificial Intelligence (AI) algorithm is tailored to create subnet level policies at block 418 and that includes processing metadata and following neighbor alert policy. The CMS then starts at block 420 a network monitoring daemon.

In certain embodiments, a threat intelligence 422 is added within the Centralized Monitoring System such that: (A) For any malicious IP login requests with a suspected CFR score, CMS will dynamically present a fake root shell/session (e.g., by using a pseudo terminal) which allows the execution of regular commands but restricts the execution of harmful commands. The fake root shell/session can also be used to handle any non-interactive login requests and restrict execution of harmful remote commands (ex: rsh, batch jobs, ftp etc.); and (B) Establishing a driver-navigator style of pairing between the fake root shell, actual root shell & the CMS, such that in case of hacker attempting to execute any pre-defined harmful commands, CMS will invoke an alternate multi-factor authentication or CMS can even kill entire fake root shell session in case of highly suspicious activity.

In certain embodiments, an AI algorithm is implemented to create and manage subnet level policies for dynamic zoning by mechanisms that perform the following: (i) Create and maintain subnet level metadata file. This metadata file contains key information about the type of critical data hosted under each host system within the subnet (ex: critical or non-critical); (ii) Feed subnet level metadata as input to CMS threat intelligence software which leverages k-means, an unsupervised learning algorithm to dynamically create network zones based on IP classifications and accordingly present a multi-layered secure access to the user; and (iii) Create neighbor alert policy such that if any system within a subnet is compromised with an attack, system will alert all the neighbors and the CMS who can then restrict further spread of threat (like IP or MAC spoofing, Malware distribution, Phishing attacks, Man-in-the middle attacks and so on) by completely isolating that compromised system and the IP from rest of the network.

In certain embodiments, mechanisms are provided to use Bayesian and Thompson sampling model to contact trace the source of malicious IP or MAC in case of any security breach incident and CMS to add such IP/MAC address under a restricted list.

Figure 5:
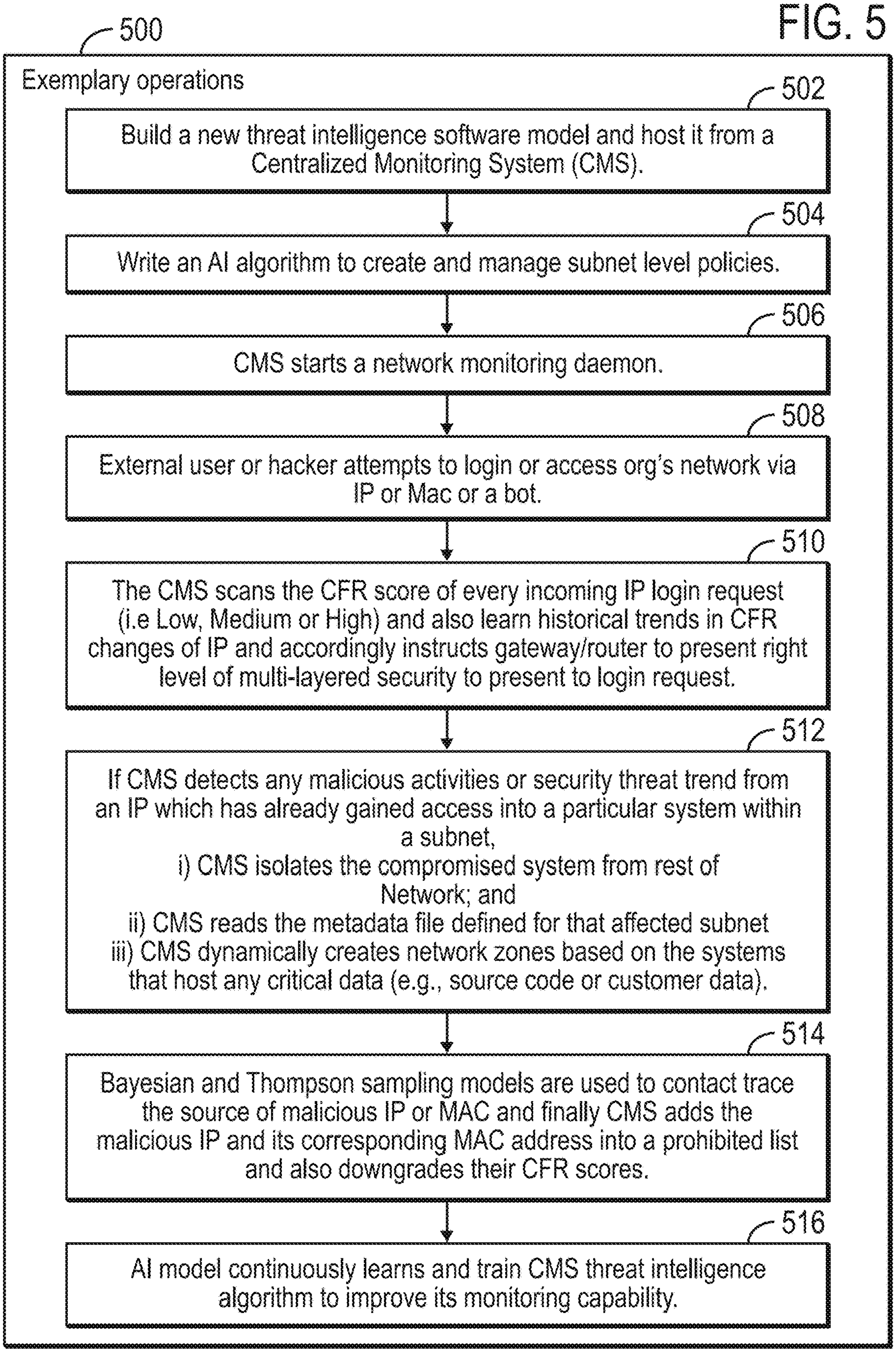
FIG. 5 illustrates a flowchart that shows additional exemplary operations to handle network attacks, in accordance with certain embodiments.

FIG. 5 illustrates a flowchart 500 that shows additional exemplary operations to handle network attacks, in accordance with certain embodiments.

Control starts at block 502 in which a process builds a new threat intelligence software model and hosts it from a Centralized Monitoring System (CMS). This model comprises a compliant IP converter module, a centralized compliant IP and compliant MAC database modules, and a CFR rules definition module.

The Compliant IP converter module converts all regular IPs (within an organization's network) into compliant IPs by embedding the proposed CFR flag. Even if there are any external IPs that want to access any of systems within the organization's network, it must register into CMS first and then get converted into a compliant IP.

The Centralized compliant IP and compliant MAC database modules build databases of all compliant IPs and MACs (along with their CFR scores) that are authorized to communicate within the network. The CMS will have write-access to CFR field of every IP address and CMS will also record historical CFR score changes of a particular IP, promote or demote CFR score of a particular IP. The Compliant IP converter module of certain embodiments converts each internal and external IP into compliant IP by embedding CFR flag and every IP will be registered into Centralized Monitoring System (CMS). CMS will also create compliant IP: MAC mapping table to ensure each IP is mapped to its corresponding MAC to detect and prevent any spoofing at IP or MAC level.

The CFR rules definition module performs operations in which the CMS will define the rules for the CFR score of every IP address based on the intensity of malicious breach it induces into the network system (e.g.: Severity 1, Severity 2, etc.) Each organization may have the flexibility to define CFR range from 1-100 (higher the CFR score indicates the higher IP compliance) and default CFR values can be defined based on their network security requirements.

For simplicity, in certain embodiments the CFR scores are categorized primarily into the following three values: low, medium, and high. The standard process to define an initial CFR score (even when no data is available) may define the CFR to be high medium or low.

The CFR may be defined to be High for or all internal IPs of an organization's network.

The CFR may be defined to be medium for an external IP which is gaining access to an organization network for the first time. This can be "Lower Medium" if CMS happens to find any past instances of an external IP belonging to same external network/subnet that was involved in some kind of suspicious network activities in the past. CMS can leverage some techniques like bad network effect, trust value graph of malicious network neighbors etc.

The CFR may be defined to be Low, for or any specific external IP that was red flagged by CMS in the past for involving in a particular instance of malicious network activity.

The Generic formula to calculate CFR score is performed as follows: For a particular IP, [Total number of times this IP is compliant-no. of times IP is non-compliant]/Total number of times IP accessed the network]×100%, i.e., $CFRi=[(Tc-Tnc)/Ta]\times 100\%$.

Organizations can define percentage ranges for each CFR score. For example: CFR=High (>=99.5%); CFR=Medium (50-99.5%); and CFR=Low (<=50%)

For every known IP address that is involved in ethical network communication, certain embodiments promote its CFR score (from its current default value). This can increase the confidence with such IP addresses. Similarly, for every known IP address that is involved in unethical network communication, embodiments demote its CFR score. Only CMS has the authority to demote or promote CFR scores of an IP based on its behavior or suspicious activity. For example, if an IP having CFR=High, fails to enter correct root login password consecutively for a pre-set condition, then certain embodiments demote its value to "Medium." The system owner or network administrator will pre-define a known set of harmful commands whose execution is restricted by enabling second level multi-factor authentication.

From block 502 control proceeds to block 504 in which the process writes an AI algorithm to create and manage subnet level policies. The process creates subnet level metadata file which contains key information about the type of critical data hosted under each host system within the subnet (e.g., critical or non-critical) and then feeds this metadata as input to a CMS threat intelligence software. The process creates neighbor alert policy such that if any system within a subnet is compromised with an attack, the process alerts all neighbors and the CMS that can restrict further spread of threat (like IP/MAC spoofing, Malware distribution, Phishing attacks, Man-in-the middle attacks and so on) by completely isolating that compromised system from rest of network.

From block 504 control proceeds to block 506 in which the CMS starts a network monitoring daemon. This daemon will work in conjunction with the gateway or router of the organization's network and will be continuously monitoring whether incoming IP requests have CFR flag, differentiate normal vs harmful commands, and identifies any security incidents etc.

Control proceeds to block 508 in which an external user or hacker attempts to login or access org's network via IP or Mac or a bot.

The CMS will then scan (at block 510) the CFR score of every incoming IP login request (i.e., Low, Medium, or High) and also learn historical trends in CFR changes of IP and accordingly instructs gateway/router to present right level of multi-layered security to present to login request. For example: (a) If CFR=Low, in which case CMS instructs the gateway/router to prevent the malicious IP at the very first gate of network access and puts such IP and its corresponding MAC under a prevented list; and (b) If CFR=Medium, CMS will instruct the gateway/router to still allow such suspected IP login to the network upon entering successful root password however presents a customized fake root shell/session (e.g., using a pseudo terminal) to allow the execution of regular commands but restrict the execution of harmful commands. The fake root shell/session can also be used to handle any non-interactive login requests and restrict execution of harmful remote commands (ex: rsh, batch jobs, ftp etc.).

Embodiments also propose to establish a driver-navigator style of pairing between the fake root shell, actual root shell and the CMS, such that in case of hacker attempting to execute any pre-defined harmful commands, CMS will take a decision of invoking an alternate multi-factor authentication or CMS can even kill entire shell session in case of highly suspicious activity.

In certain embodiments, if CFR=High, then CMS allows the IP login to access desired system upon correct entry of root password.

From block 510 control proceeds to block 512 where if CMS detects any malicious activities or security threat trend from an IP which has already gained access into a particular system within a subnet, then the following operations are performed: The CMS isolates the compromised system from the rest of the network and reads the metafile defined for that affected subnet. CMS reads the metadata file defined for that affected subnet and uses k-means, an unsupervised learning algorithm to dynamically create zones depending on type of critical data hosted within each system of that subnet and accordingly presents multi-layered secure access to the users. CMS uses neighbor alert policy to alert all neighbors of affected system/subnet and also restricts further spread of threat (like IP/MAC spoofing, Malware distribution, Phishing attacks, Man-in-the middle attacks and so on) which can likely originate from that compromised system. Control then proceeds to block 514 in which the process uses Bayesian and Thompson sampling model to contact trace the source of malicious IP or MAC and finally CMS will add the malicious IP and its corresponding MAC address into prohibited list and also downgrade their CFR scores.

From block 514 control proceeds to block 516 where the AI model may continuously learn and train CMS threat intelligence algorithm to improve its monitoring capability such that it can quickly and accurately detect any security threats and accordingly secure the overall network.

The CFR proposal can work in conjunction with IPsec protocol (whose main use case is to secure IP packets including headers via encryption). The CFR proposal extends the security by isolating the host system/IP from performing malicious activity.

Figure 6:
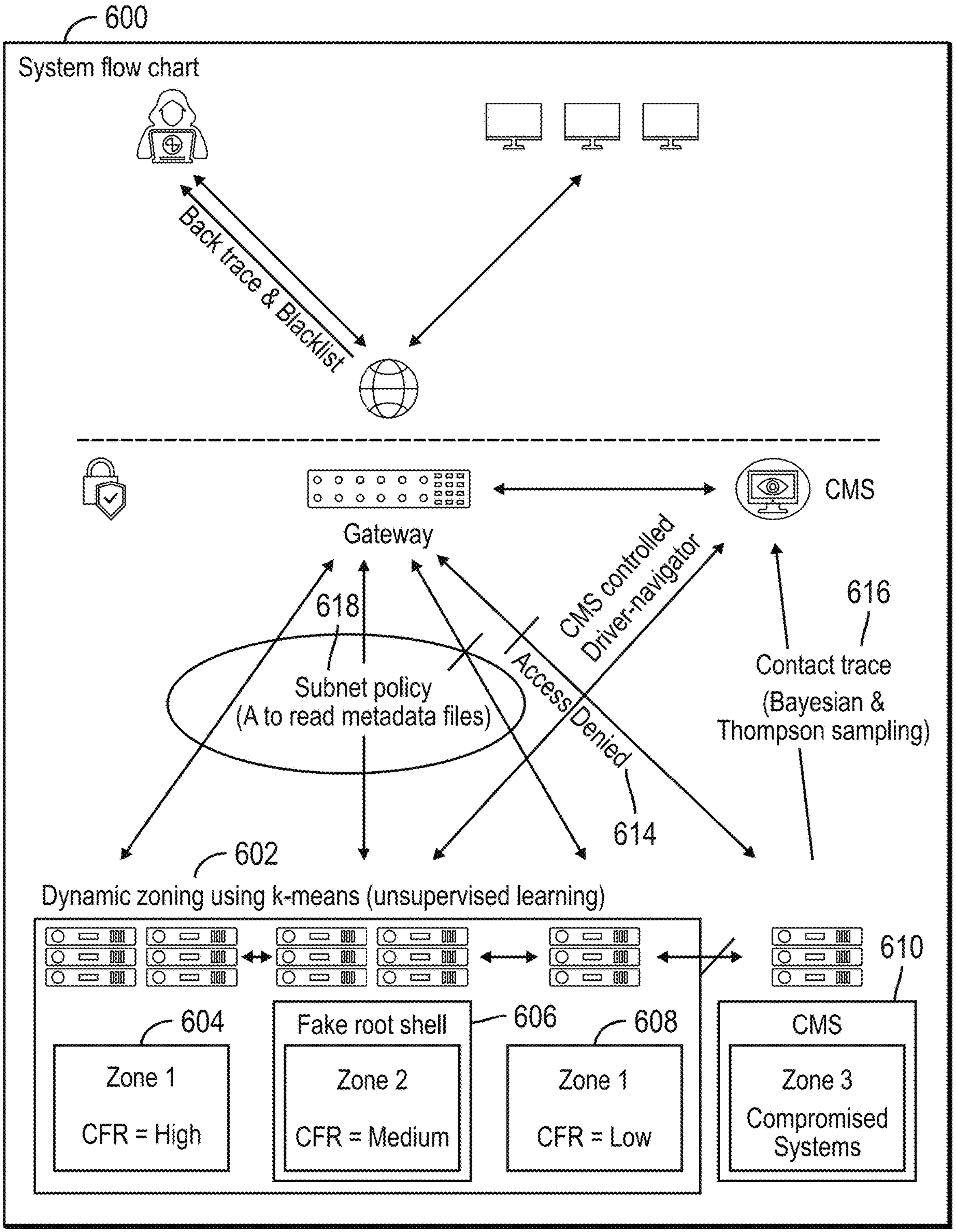
FIG. 6 illustrates a system flowchart, in accordance with certain embodiments.

FIG. 6 illustrates a system flowchart 600, in accordance with certain embodiments.

Dynamic zoning using unsupervised learning is shown via reference numeral 602. Zone 1 with a high CFR is shown via reference numeral 604. Zone 1 with a medium CFR is shown via reference numeral 606 and is associated with a fake root shell for those entities that are placed in zone 2. Zone 1 with a low CFR is shown via reference numeral 608. Also, a zone 3 with compromised systems is shown via reference numeral 610.

FIG. 6 illustrates a flowchart that shows exemplary operations to handle network attacks, in accordance with certain embodiments. Access is denied to entities in zone 3 as shown via reference numeral 614. Contact tracing is shown via reference numeral 616, and subnet policy via reference numeral 618.

Figure 7:
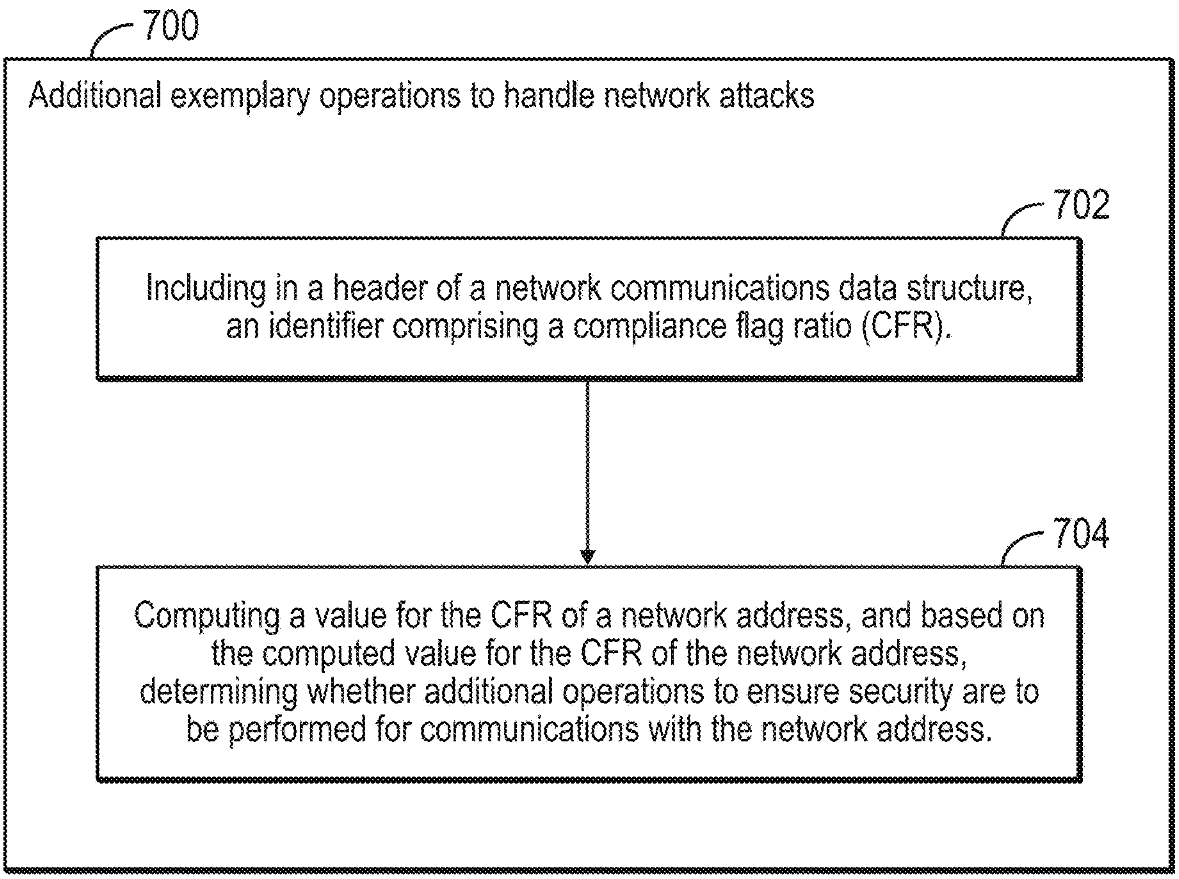
FIG. 7 illustrates a flowchart that shows additional exemplary operations to handle network attacks, in accordance with certain embodiments.

FIG. 7 illustrates a flowchart 700 that shows yet additional exemplary operations to handle network attacks, in accordance with certain embodiments.

Control starts at block 702 in which operations are performed to include in a header of a network communications data structure, an identifier comprising a compliance flag ratio (CFR). Operations are performed (at block 704) for computing a value for the CFR of a network address, and based on the computed value for the CFR of the network address, a determination is made as to whether additional operations to ensure security are to be performed for communications with the network address.

Therefore, FIGS. 1-7 illustrate certain embodiments for improving the operations of computing systems by reducing the impact of IP or MAC spoofing and improving computer and network security.

In certain embodiments, dynamic zoning is performed. In dynamic zoning k-means algorithm is used to group IP addresses into a cluster also known as dynamic zoning based on CFR scores. The operations include:

1. Data Preparation: Gather a dataset containing information about IP packets, including source, destination IP addresses, MAC addresses, current CFR score of incoming IP and the subnet level metadata information.
2. Feature Selection: Use CFR score to effectively distinguish IP packets based on the intensity of malicious breach IP address induces into the network system.
3. Normalization: Normalize the data to ensure that all features are on a comparable scale, enabling accurate computation of distances between data points.
4. Selecting K: Identify 3 clusters also known as dynamic zone based on the final implementation requirement to set the multi-layered secure access.
5. Initial Centroid Selection: initial centroids for each cluster will be chosen based on the CFR scores for High (>=99.5%), Medium (50-99.5%) and Low (<=50%).
6. Iteration and Assignment: Apply the k-means algorithm iteratively. Assign each data point (IP packet) to the nearest centroid and update the centroids based on the CFR score. Repeat this process until the centroids stabilize or a predefined convergence criterion is met.
7. Convergence Criteria: When all the IP addresses have been assigned to a specific cluster based on CFR score, the algorithm has clearly isolated different IP packets.
8. Evaluation: Assess the quality of the clusters by constantly checking the CFR score of an IP address to evaluate the coherence within clusters and separation between them.
9. Visualization: Visualize the clusters on a graph, representing the different clusters using various markers or colors. This visualization aids in comprehending the clustering results and identifying the distinct CFR score.
10. Interpretation: Interpret the clusters to comprehend the characteristics of IP packets associated with different CFR scores. Based on each cluster requirement, set the multi-layered secure access.

By following these sequence of operations, certain embodiments effectively utilize the k-means algorithm to cluster IP packets based on their CFR score and successfully secure the network dynamically into zones based on prior knowledge of the incoming IP and activities performed within the network.

For clusters with CFR score low, certain embodiments use Thomson modelling to trace back the original IP host. Using ML model to contact trace malicious IP or Mac (which caused security incident) involves the following:

1. Collect the samples of the IP and Mac addresses.
2. Use Bayesian and Thompson sampling to randomly draw a point within the sample distribution.
3. The point draw would determine the contribution of reward maintained within a given waiting period (i.e., how much we have learned).
4. The density functions informs users of the probability that the system will perform further learning.
5. Embodiments invert the probability of learning more to not learning.
6. Certain embodiments sum the probability of not learning until the system reaches or exceeds 100%.
7. At this point, certain embodiments stop exploration and say the sample at that point is the starting IP or Mac address from which the malicious things started.
8. This would provide crawler points to discover any additional IP or MAC addresses from those malicious users.

Certain embodiments create a neighbor alert policy such that if any system within a subnet is compromised with an attack, the system alerts all the neighbors and the CMS may then restrict further spread of the threat (e.g., IP or MAC spoofing, Malware distribution, Phishing attacks, Man-in-the middle attacks and so on) by completely isolating that compromised system and the IP address from rest of the network.

In certain other embodiments, for any malicious IP login requests with a suspected CFR score, the CMS may dynamically present a fake root shell/session (e.g., by using a pseudo terminal) which allows the execution of regular commands but restricts the execution of harmful commands. The fake root shell/session may also be used to handle any non-interactive login requests and restrict execution of harmful remote commands (e.g., rsh, batch jobs, ftp etc.).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 8:
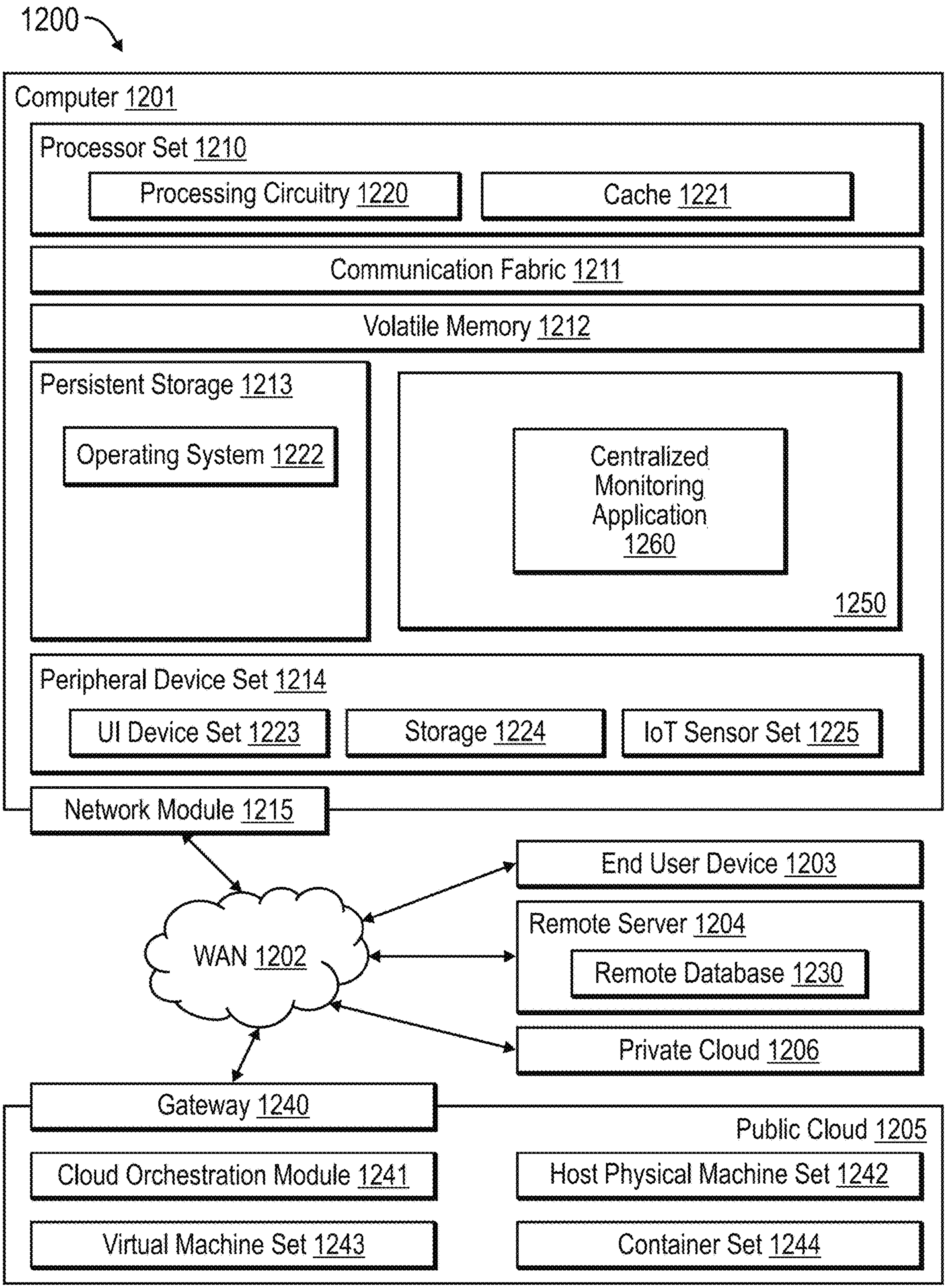
FIG. 8 illustrates a computing environment in which certain components may be implemented, in accordance with certain embodiments.

In FIG. 8, a computing environment 1200 contains an example of an environment for the execution of at least some of the computer code (block 1250) involved in performing the operations for a centralized monitoring application 1260 that performs operations shown in FIGS. 1-7.

In addition to block 1250, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1250, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible computer 1201 may be located in a cloud, even though it is not shown in a cloud in FIG. 6. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1250 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface-type operating systems that employ a kernel. The code included in block 1250 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. I/O T sensor set 1225 is made up of sensors that can be used in Internet of Things applications. For example, one sensor may be a thermometer, and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:

converting, by a centralized monitoring system, a network communications data structure of an internal network address of an internal network into a compliant network communications data structure by including in a header of the network communications data structure, an identifier comprising a compliance flag ratio (CFR);

performing, by the centralized monitoring system, a registration of an external network address that requests access to a device within the internal network, wherein the external network address gets the network communications data structure of the external network address converted into the compliant network communications data structure via the registration, wherein each conventional external and internal header is converted to a compliant header by embedding the CFR in one or more reserved bits of the header;

defining, via the centralized monitoring system, rules for CFR scores, wherein the CFR scores include different levels as values, and wherein the CFR for the internal network address is indicative of greater compliance with security than the CFR of the external network address during a first access of the internal network by the external network address; and computing a value for the CFR of a selected network address, and based on a computed value for the CFR of the selected network address, determining whether additional operations to ensure security are to be performed for communications with the selected network address.

2. The method of claim 1, wherein the header is of an Internet Protocol (IP) address.

3. The method of claim 1, the method further comprising:

creating and managing subnet level policies for dynamic zoning by using k-means which is an unsupervised machine learning mechanism, wherein at least two different zones have different levels of security requirements.

4. The method of claim 3, the method further comprising:

in response to a security breach, using a Bayesian and Thompson sampling model to contact trace a malicious IP address and isolate communications with the malicious IP address.

5. The method of claim 1, wherein each conventional external and internal IP header is converted to a compliant IP header by embedding the CFR, and wherein a mapping of an IP address and a corresponding Media Access Control (MAC) address is maintained.

6. The method of claim 1, wherein the CFR maintains information on a safety level of a source IP and stores changes in the safety level over time.

7. The method of claim 1, wherein the value of the CFR denotes a level of safety of communications with an IP or MAC address.

8. The method of claim 1, the method further comprising:

configuring a neighbor alert policy, wherein in response to any system within a subnet of a network being compromised with an attack, all neighbors of a system that is compromised and a central monitoring system are alerted, to restrict further spread of threat posed by the attack, by completely isolating the system that is compromised and an IP address causing the attack, from rest of the network.

9. The method of claim 1, wherein in response to any malicious IP login requests with a suspected value for the CFR, a fake root shell or session is presented, wherein the fake root shell allows execution of regular commands but restricts execution of potentially harmful commands, and wherein the fake root shell or the session is used to handle any non-interactive login requests and restrict execution of harmful remote commands.

10. A system, comprising:

a memory; and a processor coupled to the memory, wherein the processor performs operations, the operations comprising:

converting, by a centralized monitoring system, a network communications data structure of an internal network address of an internal network into a compliant network communications data structure by including in a header of the network communications data structure, an identifier comprising a compliance flag ratio (CFR);

performing, by the centralized monitoring system, a registration of an external network address that requests access to a device within the internal network, wherein the external network address gets the network communications data structure of the external network address converted into the compliant network communications data structure via the registration, wherein each conventional external and internal header is converted to a compliant header by embedding the CFR in one or more reserved bits of the header;

defining, via the centralized monitoring system, rules for CFR scores, wherein the CFR scores include different levels as values, and wherein the CFR for the internal network address is indicative of greater compliance with security than the CFR of the external network address during a first access of the internal network by the external network address; and computing a value for the CFR of a selected network address, and based on a computed value for the CFR of the selected network address, determining whether additional operations to ensure security are to be performed for communications with the selected network address.

11. The system of claim 10, wherein the header is of an Internet Protocol (IP) address.

12. The system of claim 10, the operations further comprising:

creating and managing subnet level policies for dynamic zoning by using k-means which is an unsupervised machine learning mechanism, wherein at least two different zones have different levels of security requirements.

13. The system of claim 12, the operations further comprising:

in response to a security breach, using a Bayesian and Thompson sampling model to contact trace a malicious IP address and isolate communications with the malicious IP address.

14. The system of claim 10, wherein each conventional external and internal IP header is converted to a compliant IP header by embedding the CFR, and wherein a mapping of an IP address and a corresponding Media Access Control (MAC) address is maintained.

15. The system of claim 10, wherein the CFR maintains information on a safety level of a source IP and stores changes in the safety level over time.

16. A computer program product, the computer program product comprising a computer readable storage medium, wherein code stored in the computer readable storage medium when executed by a processor performs operations, the operations comprising:

converting, by a centralized monitoring system, a network communications data structure of an internal network address of an internal network into a compliant network communications data structure by including in a header of the network communications data structure, an identifier comprising a compliance flag ratio (CFR);

performing, by the centralized monitoring system, a registration of an external network address that requests access to a device within the internal network, wherein the external network address gets the network communications data structure of the external network address converted into the compliant network communications data structure via the registration, wherein each conventional external and internal header is converted to a compliant header by embedding the CFR in one or more reserved bits of the header;

defining, via the centralized monitoring system, rules for CFR scores, wherein the CFR scores include different levels as values, and wherein the CFR for the internal network address is indicative of greater compliance with security than the CFR of the external network address during a first access of the internal network by the external network address; and computing a value for the CFR of a selected network address, and based on a computed value for the CFR of the selected network address, determining whether additional operations to ensure security are to be performed for communications with the selected network address.

17. The computer program product of claim 16, wherein the header is of an Internet Protocol (IP) address.

18. The computer program product of claim 16, the operations further comprising:

creating and managing subnet level policies for dynamic zoning by using k-means which is an unsupervised machine learning mechanism, wherein at least two different zones have different levels of security requirements.

19. The computer program product of claim 18, the operations further comprising:

in response to a security breach, using a Bayesian and Thompson sampling model to contact trace a malicious IP address and isolate communications with the malicious IP address.

20. The computer program product of claim 16, wherein each conventional external and internal IP header is converted to a compliant IP header by embedding the CFR, and wherein a mapping of an IP address and a corresponding Media Access Control (MAC) address is maintained.

* * * * *